April 17, 1956      H. V. KINDSETH      2,742,199
REGULATOR FOR FEEDING POWDERED OR GRANULAR MATERIAL
Filed June 15, 1951      2 Sheets-Sheet 1
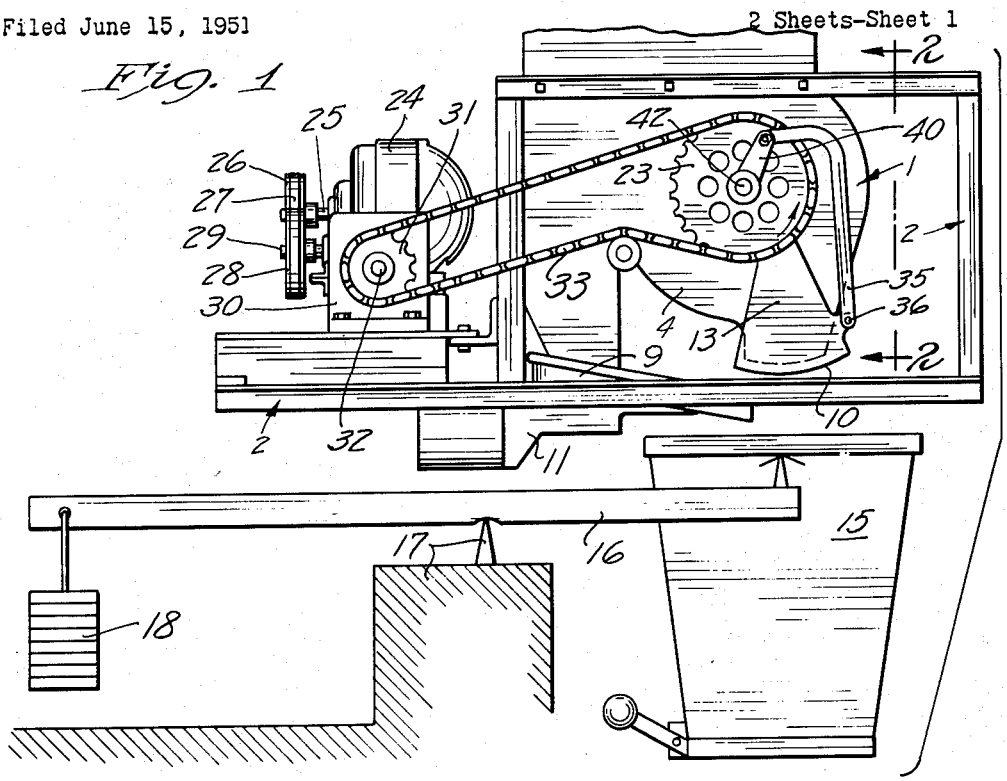
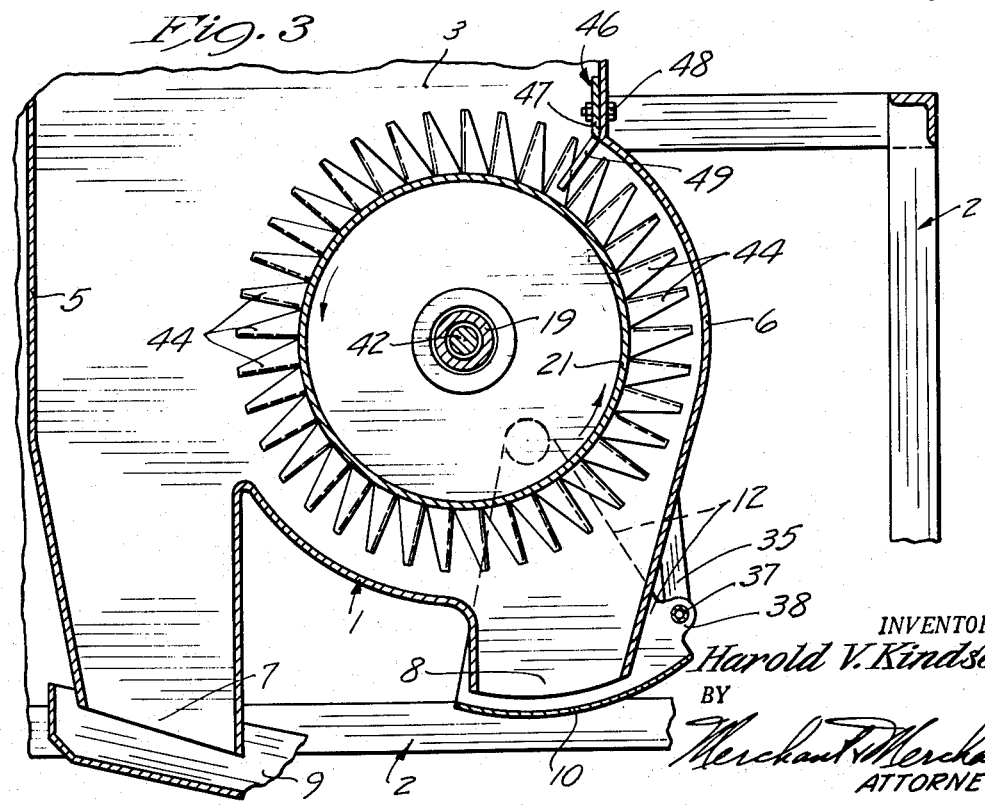
INVENTOR.
Harold V. Kindseth
BY
Merchant & Merchant
ATTORNEYS

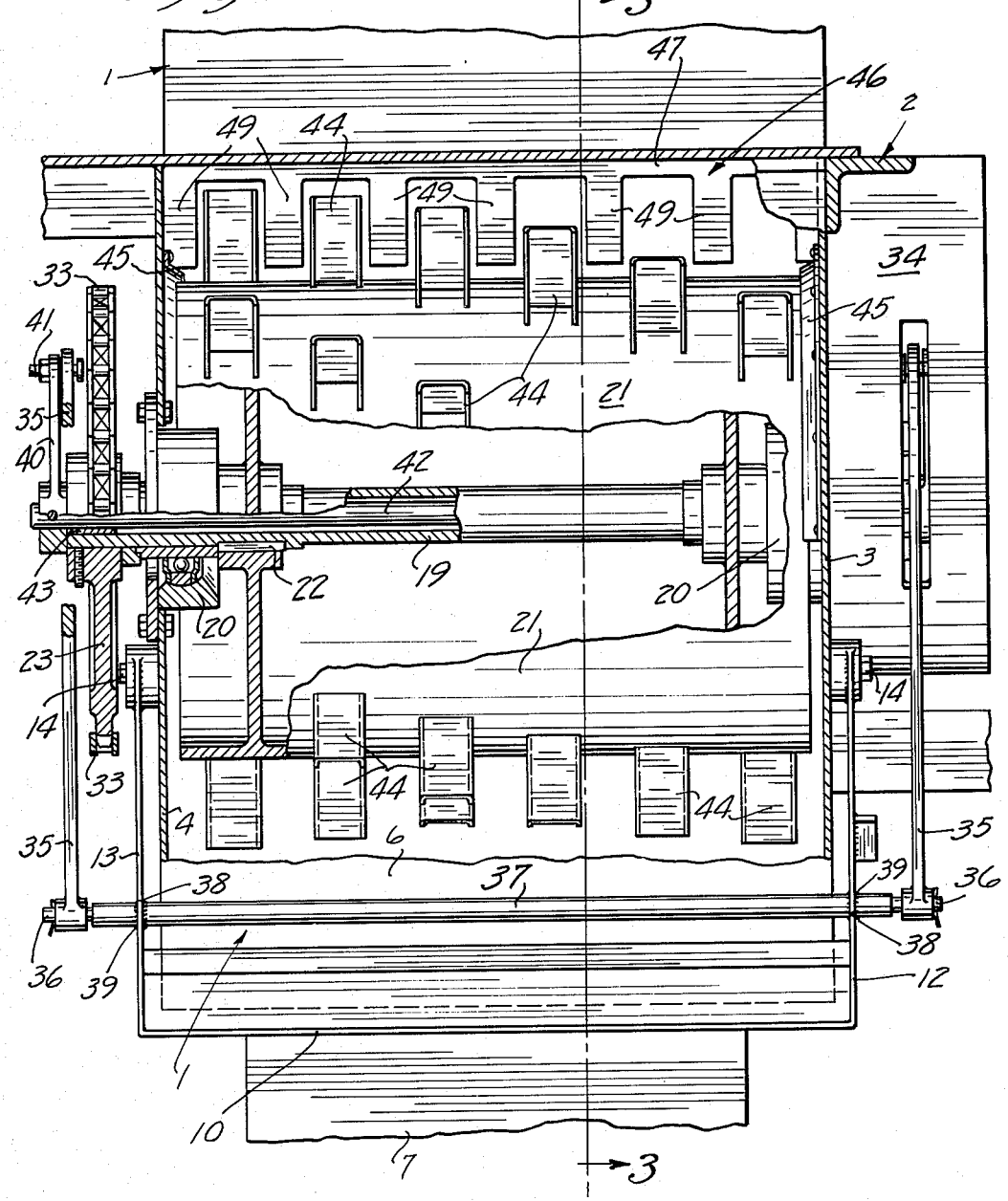

United States Patent Office 2,742,199
Patented Apr. 17, 1956

2,742,199

REGULATOR FOR FEEDING POWDERED OR GRANULAR MATERIAL

Harold V. Kindseth, Minneapolis, Minn., assignor to Bemis Bro. Bag Co., Minneapolis, Minn., a corporation of Missouri Application June 15, 1951, Serial No. 231,718

1 Claim. (Cl. 222—342)

My invention relates generally to feeding devices for powdered or granular material and more specifically to regulators for feeding such materials at predetermined speeds.

Still more particularly, my invention relates to mechanism for feeding powdered or granular material to automatic weighing devices and consists of a gate-equipped hopper having therein rotary feeding means driven at predetermined speeds from a source of power.

Mechanisms of the above type are utilized to feed a wide variety of materials, such as different types of grain, sugars, flour, cement, and the like. It is well known to those skilled in the art that each different material presents an individual problem in the feeding thereof. For instance, materials, such as flax seed or the like, tend to escape very rapidly from the feed hopper, whereas particles of other materials, such as brown sugar, flour, and certain chemicals used as fertilizers and the like, tend to adhere together and to the feeding mechanism, and are rendered incapable of efficient feeding movement through the discharge opening of a hopper. An important object of my invention is, therefore, the provision of means for preventing material in the hopper from adhering together in masses sufficiently large to interfere with efficient feeding.

Another object of my invention is the provision of feeding apparatus of the above type which will not only break up relatively large masses of granular particles adhered together, but which will prevent excessive speed of feeding movement of other more fluent material through the discharge opening of the hopper.

Another object of my invention is the provision of a feeding hopper having a discharge opening and a tooth-equipped rotary feeding drum adjacent to the opening, whereby rotation of the feeding drum at a predetermined speed will feed the material through said discharge opening.

Another object of my invention is the provision of a hopper having a discharge opening, a feeding drum adjacent the discharge opening and having radially outwardly projecting axially spaced fingers thereon, and a comb element in the hopper, said comb element having teeth which extend toward the drum in staggered relationship to the fingers thereon, whereby relatively large masses of the material to be fed, which adhere to the teeth and extend therebetween, will be effectively broken up into masses of sufficiently small size to be efficiently fed through the discharge opening.

Still another object of my invention is the provision of feeding mechanism of the above type which is simple and inexpensive to manufacture, which is highly efficient in operation, and which is rugged in construction and durable in use.

Other highly important objects and advantages of my invention will become apparent from the following detailed specification, appended claim, and attached drawings.

Referring to the drawings, which illustrate the invention, and in which like characters indicate like parts throughout the several views:

Fig. 1 is a partly diagrammatic view in side elevation of a weighing device and feeding mechanism therefor, built in accordance with my invention;

Fig. 2 is an enlarged fragmentary view partly in section and partly in end elevation as seen from the line 2—2 of Fig. 1, some parts being broken away; and Fig. 3 is a transverse section taken on the line 3—3 of Fig. 2 on a reduced scale.

The structure herein disclosed constitutes a portion of scale feeding apparatus disclosed in my co-pending application S. N. 231,717, filed of even date herewith, and entitled "Hopper and Power Actuated Discharge Gate," now Patent No. 2,661,876, issued December 8, 1953. In the drawings, a hopper is indicated in its entirety by the numeral 1 and is shown as being mounted in a frame structure 2. The hopper 1 may be assumed to be open-topped and includes side walls 3 and 4 and end walls 5 and 6. At its bottom, the hopper 1 is provided with a pair of spaced discharge openings 7 and 8, the former of which overlies a delivery conduit 9 and the latter of which is adapted to be closed by a swinging valve-acting gate 10. The delivery conduit or chute 9 is suitably mounted on a vibrator 11 which is of the electromagnetic type and conventional in design, being shown and described in greater detail in my co-pending application above identified. The gate 10 is formed to provide a pair of upstanding elements 12 and 13, the former of which extends upwardly adjacent the hopper side wall 3 and the latter of which extends upwardly adjacent the hopper side wall 4. At their upper ends, the side members 12 and 13 are pivotally secured to the side walls 3 and 4 respectively, on aligned axes, as indicated at 14, see Fig. 2.

The discharge opening 8 and the delivery end of the conduit 9 overlie a scale mounted receptacle 15 which is adapted to deliver material fed thereto to a bag or other container, not shown. As shown in Fig. 1, the receptacle 15 is mounted on one end of a scale beam 16 which is fulcrumed intermediate its ends on a suitable base of support 17. At its opposite end, the scale beam 16 is shown as being provided with a counterbalancing weight 18. The purpose and operation of the receptacle 15 and scale mechanism associated therewith are more fully described in my co-pending application above identified.

A tubular shaft 19 extends transversely through the hopper 1 and is journalled in bearings 20 rigidly mounted one each in the side walls 3 and 4 of the hopper 1. A cylindrical feeding drum 21 is keyed to the tubular shaft 19, as indicated at 22, for common rotation therewith and extends substantially the width of the hopper 1, see Fig. 2. The tubular shaft 19 extends laterally outwardly of the side wall 4 of the hopper 1 and has rigidly mounted thereon a driving sprocket 23. With reference to Fig. 2, it will be seen that the drum 21 at least partially overlies the discharge opening 8 of the hopper 1.

Means for imparting feeding rotation to the drum 21 comprises a motor 24 to the shaft 25 of which is secured a pulley 26. An endless belt 27 runs over the pulley 26 and another pulley 28 rigidly mounted on the input shaft 29 of a conventional geared speed reducer 30 bolted or otherwise secured to the frame 2. A sprocket 31 is rigidly mounted on an output shaft 32 of the speed reducer 30, and has running thereover and over the sprocket 23 an endless link chain 33. The gearing, not shown but contained within the speed reducer 30, imparts rotation to the output shaft 32 thereof in a direction to rotate the feeding drum 21 in a counterclockwise direction with respect to Figs. 1 and 3, for a purpose which will hereinafter become apparent.

Opening and closing movements are imparted to the valve-acting gate 10 by mechanism, not shown but contained within a housing 34 and described in detail in my co-pending application above identified. The mechanism within the housing 34 is coupled to the gate 10 by means of a pair of rigid links 35 one each disposed laterally outwardly of one of the side walls 3 and 4 of the hopper 1. The links 35 at their lower ends are journalled to the diametrically reduced end portions 36 of a shaft 37 extending through ears 38 on the side gate portions 12 and 13 and welded or otherwise secured thereto, as indicated at 39. The upper end of the link 35 adjacent the hopper side wall 4 is pivotally secured to the radially outer end of a crank arm 40, as indicated at 41. The crank arm 40 has its inner end pinned or otherwise rigidly mounted on one projected end of a shaft 42 that extends through and is journalled in a pair of sleeve bearings 43, one of which is shown, in the opposite ends of the tubular bearing 19. The upper end of the link 35 adjacent the hopper wall 3 is connected to mechanism operatively associated with the adjacent end of the shaft 42 within the housing 34, all as fully described in my co-pending application mentioned above.

Welded or otherwise rigidly secured to the drum 21 and projecting radially outwardly therefrom is a plurality of paddle-like fingers 44. The fingers 44 are arranged in spaced relationship in rows each of which describes a helix about the outer peripheral wall of the feeding drum 21. The rows are arranged in circumferentially spaced relationship about the drum 21, the finger 44 at one end of one row being substantially axially aligned with a finger 44 at the opposite end of an adjacent row of fingers, see Fig. 2. The spaced relationship between adjacent fingers of each helical row thereof is substantially equal in all of said rows so that the fingers are also arranged in rows extending circumferentially about the drum for a purpose which will become apparent. With reference to Fig. 2, it will be seen that a shroud 45 is mounted on the opposed inner surface of the hopper side walls 3 and 4 and slopes laterally and radially inwardly toward overlying relationship to the opposite end portions of the drum 21 to protect the bearings 20 from the material being fed through the hopper 1. The fingers 44, under rotation of the drum 21, move the material to be dispensed downwardly and laterally toward the discharge opening 8 at a predetermined rate depending upon the speed of rotation of the drum.

In the dispensing of certain granular or powdered materials, the particles of which have a tendency to adhere together to form large clumps or masses, difficulty has been experienced in preventing the same from adhering to the surface of the hopper, the drum, and the teeth on the drum. These masses, at times, build up to a point where the material bridges the spaces between the several fingers 44 on the drum 21 and reduces the speed of feed of the material through the discharge opening 8 to a minimum, at times cutting off the feed altogether. To eliminate this deficiency, I provide a comb element 46 comprising a plate-like bar or the like 47 extending in a direction parallel to the axis of the drum 21 and rigidly secured to the end wall 6 of the hopper by nut-equipped screws or the like 48. The comb 46 further includes a plurality of teeth 49 integrally formed with the bar 47 and extending in a direction generally radially inwardly toward the axis of the drum 21. The teeth 49 are spaced longitudinally of the bar 47 in a manner to be received between adjacent circumferentially extended rows of fingers 44 on the drum. With reference to Figs. 2 and 3, it will be seen that the teeth 49 terminate in closely spaced relationship to the outer peripheral surface of the drum 21.

It should be obvious that, during rotation of the drum 21, any large accumulation of material on the drum 21 between the fingers 44 thereof will be effectively broken up by the teeth 49 as they come in contact therewith. Thus, the drum is kept relatively clean and a uniform rate of feed of material through the discharge opening is maintained. It should be observed further that the teeth 49 of the comb 46 extend in a direction generally downwardly so that the tendency of material to adhere to the teeth 49 is reduced to a minimum. Furthermore, the impact between the teeth 49 and material adhering to the drum sets up sufficient vibration in the teeth 49 to dislodge any particles that might tend to adhere thereto.

The teeth 49 of the comb 46 are effective in the feeding of more fluent or non-sticky materials, such as dry grains, in that it prevents an excessive amount of the grain from escaping between the drum 21 and the end wall 6 of the hopper. This arrangement helps to insure a uniform predetermined rate of feed of the material through the discharge opening 8.

My invention has been thoroughly tested and found to be completely satisfactory for the accomplishment of the objectives set forth; and, while I have shown and described a preferred embodiment of my device, it will be understood that the same is capable of modification without departure from the spirit and scope of the invention, as defined in the claim.

What I claim is:

In a device for feeding granular bulk material, a hopper having an arcuate bottom portion and a discharge opening at one side of said arcuate bottom portion, a rotary feeding drum overlying said opening and said arcuate bottom portion of the hopper adjacent said opening, means for imparting rotary movement to the feeding drum, a plurality of axially and circumferentially spaced wide flat paddle-like feeding fingers projecting radially outwardly from the drum, relatively wide flat feeding surfaces of said fingers facing in the direction of rotation of said drum, and a rake element in said hopper, said rake element overlying a portion of the drum and extending in a direction generally parallel to the axis of rotation of the feeding drum and comprising a plurality of longitudinally spaced plate-like teeth disposed in staggered relation to the fingers on the drum and projecting laterally inwardly toward the drum in a direction generally parallel to the downward feeding movement of material in the hopper, said teeth having relatively wide surfaces facing in the direction of rotation of the drum, said teeth cooperating with the fingers upon rotation of said drum to prevent material contained in the hopper from adhering to the drum and to prevent undue leakage from the hopper of free flowing granular material.

References Cited in the file of this patent

UNITED STATES PATENTS

| 194,307 | Martin | Aug. 21, 1877 |
| 261,627 | Philpot | July 25, 1882 |
| 320,133 | Hearne | June 16, 1885 |
| 1,755,618 | Watzl | Apr. 22, 1930 |
| 2,581,037 | Meissner et al. | Jan. 1, 1952 |

FOREIGN PATENTS

| 111,292 | Switzerland | Aug. 1, 1925 |